Jan. 5, 1965 E. J. HEBERT, JR 3,164,814
MAGNETIC DEVICES
Filed June 28, 1962 2 Sheets-Sheet 1
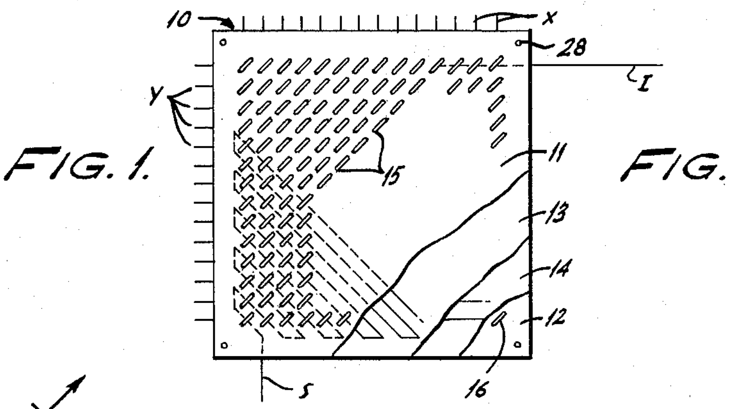
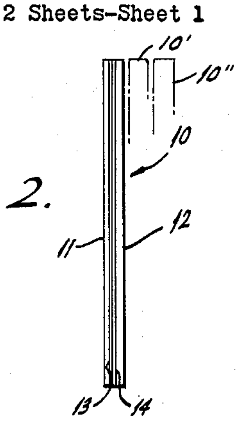
FIG. 2.
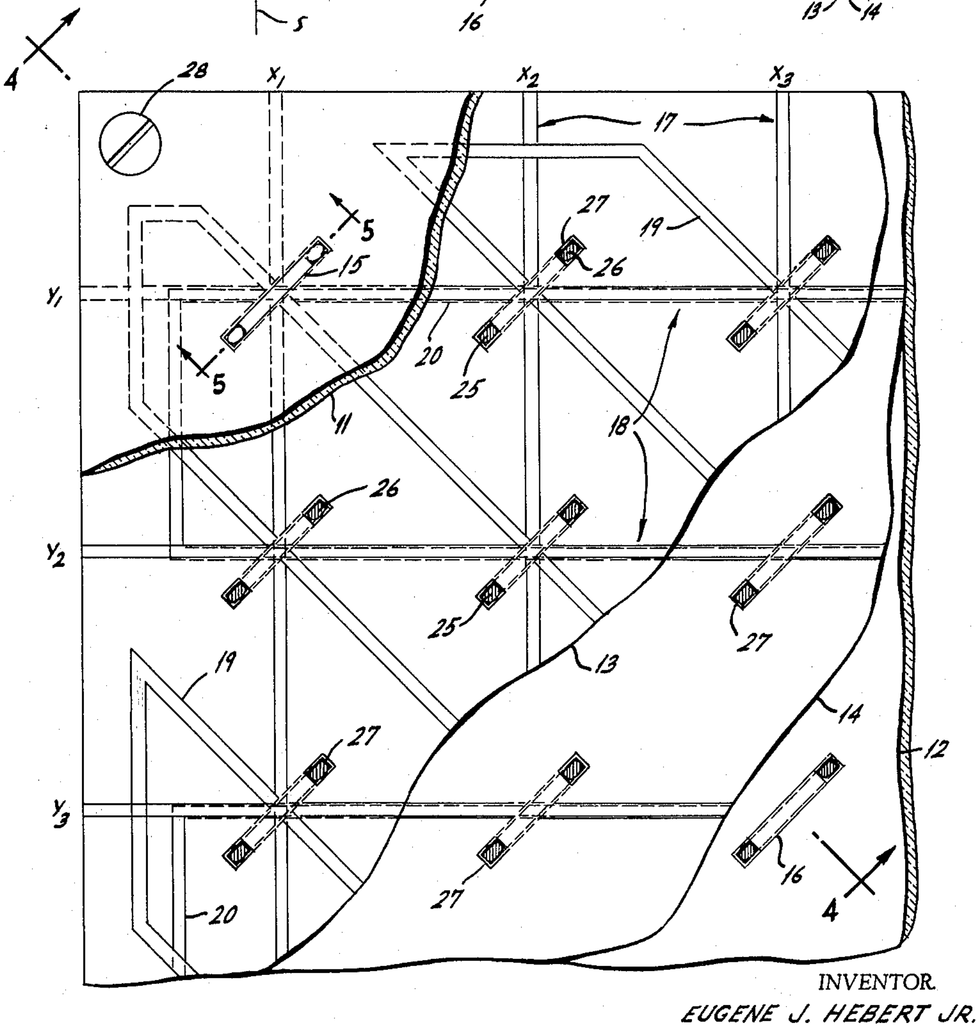
FIG. 3.
INVENTOR.
EUGENE J. HEBERT JR.
BY
F D Prose
ATTORNEY Jan. 5, 1965 E. J. HEBERT, JR 3,164,814

MAGNETIC DEVICES

Filed June 28, 1962 2 Sheets-Sheet 2

INVENTOR.
EUGENE J. HEBERT JR.
BY
F. D. Prager
ATTORNEY 3,164,814
MAGNETIC DEVICES Eugene J. Hebert, Jr., Elkins Park, Pa., assignor to Philco Corporation, Philadelphia, Pa., a corporation of Delaware Filed June 28, 1962, Ser. No. 206,061
10 Claims. (Cl. 340—174)

Figures 6, 7, 8, 9:
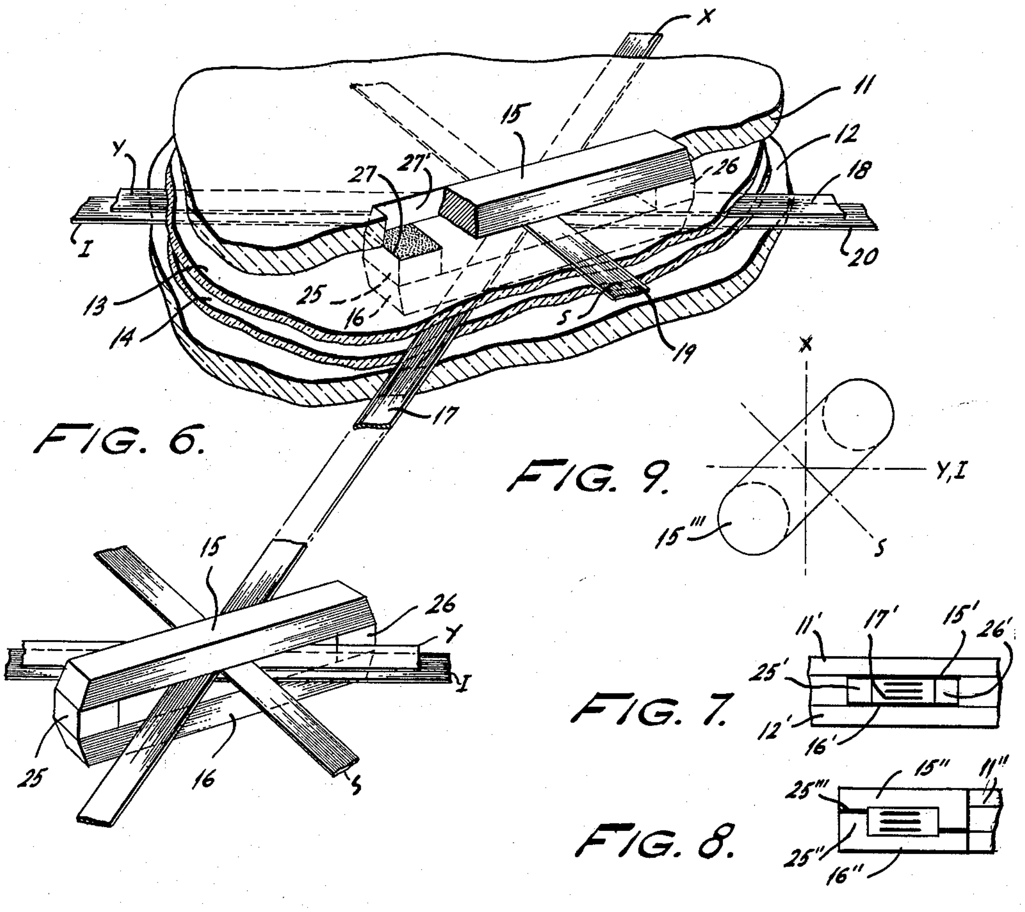

This invention relates to magnetic memory devices. It has to do mainly with so-called memory "cores" and with combinations thereof, constituting memory "planes." Larger combinations, including numbers of the planes in stacked relationship, are used as rapid access memories for instance in computers and information retrieval apparatus.

It is an object of the invention to improve memory planes with respect to their dimensional stability and thereby to make their performance more effective than it has been in the past, especially in avoiding "cross talk" between different elements of a plane. It is a further object to simplify the process of producing memory planes and to make the product more economical.

For these several purposes the invention utilizes "printed circuits" and related techniques in a new way. It applies certain printing and insertion techniques to the construction of magnetic core elements and of built-up magnetic cores composed of such elements. According to the invention the magnetic cores of a plane are not, as has generally been the case heretofore, provided by prefabricated rings hanging on or loosely inserted over crossed conductors, as is common at the present, nor are the new cores constructed in form of a composite metal plate structure or the like, as was sometimes done in the past. The new cores are built up from separate magnet elements embedded or imprinted in laminated insulator sheeting; and it is preferred to use this sheeting also to carry core windings imprinted thereon.

The new arrangement can readily be understood and evaluated upon a review of the drawing appended hereto, wherein FIGURE 1 is a plan view of the new plane structure with portions of successive layers removed. FIGURE 2 is an edge view of such plane structure. FIGURE 3, drawn on a larger scale, is an enlarged plan view of a small corner portion of the upper plane, with major portions of upper layers thereof removed to disclose underlying structure.

Figure 4:
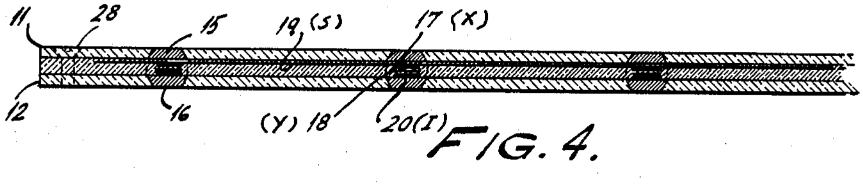
Figure 5:
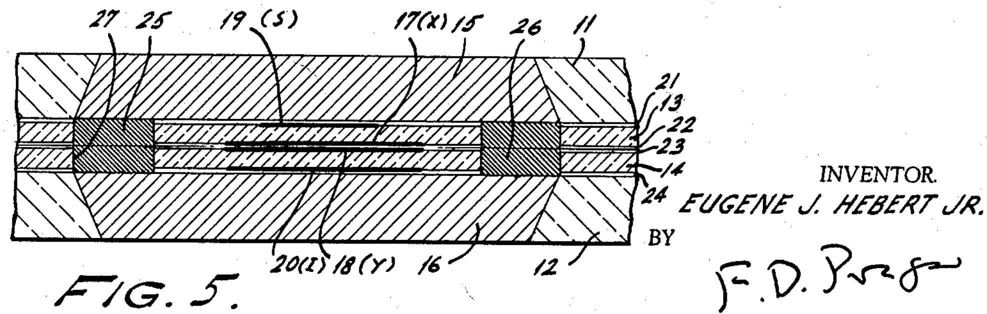

FIGURES 4 and 5 are sectional views taken respectively along lines 4—4 and 5—5 in FIGURE 3, and drawn on different scales. FIGURE 6 is a fragmentary perspective view of combined elements of apparatus of the kind shown in FIGURE 4.

FIGURES 7 and 8 are views generally similar to FIGURE 5, but showing slightly modified arrangements. FIGURE 9 is a plan view of another modification.

As appears in FIGURE 1, the new memory plane 10 comprises a pair of generally rectangular, outwardly exposed plates 11 and 12, separated by a pair of thin sheets 13, 14 to form a sandwich construction. The entire construction or sheeting 11, 13, 14, 12 is made of non-magnetic materials which preferably are electrical insulators. Advantageously the outer plates 11, 12 are rigid and the inner membranes 13, 14 are flexible.

As indicated in FIGURE 2, similar planes 10, 10′, 10″ etc. are combined to form a stack or memory unit. In each plane the outer plates have small magnetizable slabs embedded therein (FIGURE 1), thus providing bar-shaped core elements 15, 16 in plates 11, 12, respectively, which extend in directions parallel to the plates and to one another and diagonally of the sides of the plates. Additional core elements of different kind, to be described hereinafter, are provided in the intermediate flexible sheeting of each plane, which intermediate sheeting is advantageously used, in addition, as a carrier of printed core windings.

A well-known pattern for such windings is shown in FIGURE 3. It includes a series 17 of parallel "column" conductors $X_1$, $X_2$ etc. and a series 18 of parallel "row" conductors $Y_1$, $Y_2$ etc. at right angles to X, these two sets X and Y being carried, respectively, by sheets 13 and 14. The two sheets are very thin and are shown in FIGURE 3 as being generally transparent. Magnet bars 15, 16 are positioned and diagonally oriented to traverse the X, Y directions at each crossing of a pair of windings X, Y. The several windings are externally connected to the usual external wiring systems X, Y, respectively, as generally indicated in FIGURE 1. Additionally, and as further indicated in FIGURES 4 and 5, the wiring can comprise a system or systems 19 of diagonal read-out or "sense" windings S and a system or systems 20 of "inhibit" windings I parallel to write-in row windings Y. Printed sense and column windings 19 and 17 (S and X) are shown as applied to the top and bottom, respectively, of the upper membrane 13, while row and inhibit windings 18 and 20 (Y and I) are at the top and bottom, respectively, of the second membrane 14. Insulating films 21 to 24 can be interposed as shown.

As most clearly illustrated in FIGURE 6, a new type of core is provided at each crossing of a row with a column. Each core is shown as including, in addition to its pair of magnet slabs 15, 16, a pair of ring-closing slugs or keeper units 25, 26. These slugs are disposed in apertures 27 piercing the flexible sheets 13, 14 and their surface films 21 to 24 (FIGURE 5). Each pair of slugs is located to straddle a crossing of core windings X, Y, S and I. The slugs or keepers interconnect end portions of the two magnet slabs; thus each pair of them cooperates with said slabs in forming a complete, rectangular core frame unit, which by itself is somewhat similar in appearance to the iron core frame of a "rectangular core" power transformer.

The two keeper members 25, 26 as well as the two bar members 15, 16 of each core frame should be of high magnetic permeability. At least one of these members—desirably both of the bars—must have a high degree of magnetic remanence to provide a so-called square loop characteristic for the core frame. No particular remanence is needed for keepers 25, 26 if such is provided in bars 15 and/or 16. The production of the keepers, which will be described presently, is facilitated by this fact. At this point it may be noted that the non-magnetic membranes 13, 14, holding these keepers, can be made for instance of the polyester produced by E. I. du Pont de Nemours & Co. which is known as Mylar, while the outer plates 11, 12 can be made for instance of phenolic or other resinous materials, on cloth or paper or some other base. Similar materials have often been used for circuit boards or panels, in the art of printed circuits, where they however were employed to carry electrical circuit components on their outside surfaces. According to this invention, by contrast, magnetic circuit components are installed between such surfaces. Each component is a core frame, built up from magnetizable parts 15, 25/26, and 16 which are embedded in the respective laminations 11, 13/14, and 12 of a non-magnetic sheeting structure.

Fabrication of the new memory plane comprises the major steps of (*a*) inserting magnet slabs 15, 16 in plates 11, 12; inserting the material for magnet slugs 25, 26 (preferably together with conductor wiring X, Y, S, I) in sheeting 13, 14; and (*b*) combining the several plates and sheets, with the magnet elements or materials therein, into a memory plane.

The inserting operations can be performed by hand, for instance by manually dropping bars 15, 16 into suitable recesses 27' of boards 11, 12 (FIGURE 6), or they can be automated by techniques which are known as such in the art of printed circuitry. Automatic insertion or printing techniques can also be used not only to provide imprinted copper wiring X, Y, S, I on sheeting 13, 14 but also to form for instance relatively loose dots or spots of ferrite in apertures 27 of this sheeting, which ferrite can then be compacted into slugs 25, 26. Large numbers of core and winding elements can thus be formed with great rapidity, in contrast to the slow and difficult core-threading operations heretofore generally used in the construction of planes.

Testing and associated operations are also improved. The usual tests, determining mainly whether a core or core portion has the required magnetic and other characteristics, were heretofore time consuming and also destructive, as it was necessary in each test (1) to slide a small core ring onto a system of test wires, (2) to transfer the wires and ring to a position for electronic test, (3) after the test to return them to an unloading position, (4) to slide the ring from the test wires, (5) to throw the ring into a storage bin, thereafter (6) to place the ring in a plane fabricating jig, (7) to slide an X wire through it, and (8 to 10) to slide Y, S and I wires through it. The core surface was thus exposed to at least about ten operations in each of which it could be, and often was, impaired by mechanical effects such as the breaking out of particles. In accordance with the invention, by contrast, cores can immediately be formed in association with their ultimate windings. While tests are still needed or desirable, these can now be applied—for instance to magnet bar elements 15, 16—in ways substantially reducing the probability of core destruction and impairment.

The process includes, as indicated, the ultimate step of finishing and combining magnet bars 15, 16 and slugs 25, 26 into a frame. In this step it is important to avoid the occurrence of a continuous air film and corresponding air gap at any one of the interfaces between the bars and slugs. Various procedures can be used for this latter purpose. It is possible for instance manually or mechanically to incorporate the slugs (in apertures 27 of combined flexible sheeting 13, 14, on bottom plate 12, FIGURE 6) by forming small, mechanically soft, compressible heaps or spots of ferrite powder and then to compact the powder against the pairs of magnet slabs, by vibration and pressure techniques. This can be done with little or no rise of temperature over ordinary room temperatures, and coherent magnet slugs can thus be formed and firmly bonded to the slabs. The desired magnetic characteristics can thus be provided and preserved in the completed cores, even when the materials are highly sensitive to heat; and any air or gas, remaining in a core, is then present only in form of small, discontinuous inclusions in slugs 25, 26, not as a continuous film or air gap.

When the rigid top and bottom boards 11, 12 have thus been assembled with sheeting 13, 14 and with their respective core elements, the entire unit can be secured together by fasteners such as bolts or rivets 28, FIGURES 3 and 4, to insure indexing of the parts and to maintain the needed cohesion between the several elements of each magnetic core, without air gap therein. Such cohesion can also be aided by additional and basically well known techniques whereby the slug material is cemented or bonded to the ends of the slabs, of course with suitable precaution to maintain proper magnetic characteristics. Firm and suitable retention of the magnet slabs can be insured in various ways, for instance by forming them in inwardly flaring, outwardly tapering form, matched with corresponding form of recesses 27' in the retaining boards, as is best indicated in FIGURE 6.

Very adequate and advantageous performance of "write-in" and "read-out" operations in accordance with well-known requirements of computer systems, is provided by the new plane construction. Heretofore, as mentioned, a serious danger of cross talk was often encountered, as core rings were generally loosely threaded onto freely extended wires; these cores were able to lose their predetermined arrangement, for instance when the wires sagged or distorted. The new planes, while being of simple and inexpensive construction, are free of any such loss of dimensional prearrangement and are therefore free of any such danger of cross talk, both within and between the individual planes of a memory unit.

Other plane arrangements were heretofore proposed, which utilized various forms of composite magnet or conductor sheets. Most of these were rather expensive to build and they were still devoid of the advantages provided by the new, individual, built-up core frames formed of two dissimilar pairs of elements 15, 25, 16, 26. In comparison with the prior art magnet plate constructions, the new core plane has the considerable advantage that it uses individual cores, avoiding problems such as those of magnetic flux leakage between cores of the same plane. In addition, as mentioned, the new core construction has the advantage of being embedded and firmly held in a form-retaining sheet unit, whereby it also avoids cross talk within and between the different planes.

The operation of a core plane depends largely on proper inductive linkage between cores and windings. In the illustrated form, core frame 15, 16, 25, 26 is flat and low, in contrast to the circular or toroidal design of the usual memory core ring. This flat arrangement of the new core insures very adequate and close inductive linkage between the core slabs 15, 16 and windings X, Y, S, I. The resulting utilization of electric write-in, read-out and inhibit pulses is at least as efficient as the performance of the planes using the usual circular core rings.

It is believed unnecessary herein to describe other operational details, such as the generation, sequence and use of the electric pulses travelling along windings X, Y, S and I. Such pulses can be applied and employed in various ways, well known to the computer art. As repeatedly noted herein, their use is particularly enhanced by the safe elimination of cross talk in accordance with this invention.

Referring finally to the modified constructions, as indicated in FIGURE 7 it is not always necessary to make the flat elongate magnet element 15, 16, in form of a relatively heavy bar, for instance a bar as thick as the carrier board, 11 or 12; slab elements 15', 16' can be provided instead by means of film or coating structures, and these can be applied to carrier plates 11', 12' by techniques somewhat similar to those employed in the imprinting of conductors 17' etc. on the intermediate sheeting, or to the application of magnetic layers to recording tapes or the like.

On the other hand, as indicated in FIGURE 8, slabs 15'', 16'' can be made in such form that for instance slug elements 25'' are also provided thereby. All or part of their structure may then project not only through but beyond the supporting board or plate 11''. However, in the interest of suitable closure of the magnetic circuit, without an air gap, it is still desirable to provide additional, gap-closing slug material 25''' between every pair of adjacent ends of magnet bars or bodies which may be formed in such ways.

As finally shown in FIGURE 9, a rounded shape or construction 15''' can be used for the ends of a magnet slab and for the formation of the interconnecting magnet slugs. This construction facilitates mainly the forming of suitable apertures in the carrier sheeting.

While only a few embodiments of the invention have been described, it should be understood that the details thereof are not to be construed as limitative of the invention except insofar as is consistent with the scope of the following claims.

I claim:

1. In a core unit:
a system of frame-like magnetizable cores, each core comprising a pair of parallel, coextensive magnetizable bar elements and a pair of magnetizable slug elements interconnecting ends of said bar elements, all of said several elements having high magnetic permeability and at least one of said several elements also having high magnetic remanence;
sheeting of non-magnetic, electrically non-conductive material embedding said magnetizable cores; and
electric conductors providing the windings of said cores in said sheeting.

2. In a core unit as described in claim 1 the feature that said conductors are imprinted on said sheeting.

3. A memory device, comprising
a pair of magnetic bars one facing the other;
sheeting between said bars;
a pair of magnetic slugs disposed in apertures of said sheeting and interconnecting end portions of said bars to form a closed frame, said frame having high magnetic permeability and at least one of said bars also having high magnetic remanence; and
core windings on said sheeting, extending through and angularly disposed relative to said frame.

4. As a memory unit,
a pair of generally parallel magnetic core elements, one facing the other;
sheeting between said core elements;
magnetic core elements disposed in apertures of said sheeting and interconnecting end portions of said generally parallel core elements; and
core windings on said sheeting, indexed with and angularly disposed relative to said pair of generally parallel core elements;
all of said core elements having high permeability and at least one also having high remanence.

5. In a core unit of the type using printed core plane windings:
a pair of parallel, magnetizable members indexed with a crossing of said windings, said windings and magnetizable members being disposed in parallel planes; and
a second pair of magnetizable members, disposed between end portions of said parallel members and interconnecting said end portions to form a complete magnetic circuit frame;
at least one of the four members having high magnetic remanence.

6. A memory core unit comprising
a first pair of magnet elements, one parallel to and coextensively facing the other,
non-magnetic and electrically non-conductive sheeting between said magnet elements,
a second pair of magnet elements, disposed in apertures of said sheeting, transversely of the first pair and interconnecting portions of the first pair into a closed magnet frame; and
electric conductors in said sheeting, extending between and beyond the magnet elements of said first and second pairs, for switching magnetic signals into and out of said magnet frame; at least one of the elements of said frame having high magnetic remanence.

7. An electromagnetic memory unit comprising
a pair of generally rectangular, rigid plates of electrically insulative, non-magnetic material, one facing the other,
high remanence, high permeability magnetic core bars on each of said plates, oriented in general parallelism, in the planes of the plates and diagonally of the edges of the plates;
flexible sheeting of electrically insulative, non-magnetic material between said plates, with core plane windings imprinted on said sheeting; and
high permeability magnetic core slugs disposed in apertures of said sheeting spaced from said windings, said slugs interconnecting end portions of said core bars to unite each pair of core bars with a pair of core slugs into a closed magnet frame, with said windings extending through said frame to provide the memory unit.

8. A memory unit as described in claim 7 wherein said windings include write-in and inhibit windings parallel to the edges of said plates and sense windings diagonal thereto and normal to said core bars.

9. A memory plane comprising:
a generally flat system of core windings including write-in and read-out windings, disposed to provide crossings thereof; and
a pair of generally flat arrays of individual, parallel core bars, one array generally closely overlying and the other array generally closely underlying said system of core windings, each array including a core bar for each of said crossings and each resultant pair of core bars being arranged to form in substance a closed magnetizable high remanence ring around one of said crossings.

10. A memory plane as described in claim 9 wherein the core bars taper toward the outside of the plane, said plane including a non-magnetic structure wherein such tapering bars are retained in correspondingly tapering recesses.

References Cited in the file of this patent

UNITED STATES PATENTS

| | | |
|---|---|---|
| 2,985,948 | Peters | May 30, 1961 |
| 3,040,301 | Howatt et al. | June 19, 1962 |
| 3,102,999 | Bernemyr et al. | Sept. 3, 1963 |